US008001407B2

(12) United States Patent
Malone et al.

(10) Patent No.: US 8,001,407 B2
(45) Date of Patent: Aug. 16, 2011

(54) SERVER CONFIGURED FOR MANAGING POWER AND PERFORMANCE

(75) Inventors: Christopher G. Malone, Roseville, CA (US); Thomas L Vaden, Bridgewater, NJ (US); Martin Goldstein, Cupertino, CA (US); Carey Huscroft, Roseville, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 932 days.

(21) Appl. No.: 11/590,320

(22) Filed: Oct. 31, 2006

(65) Prior Publication Data

US 2008/0104430 A1 May 1, 2008

(51) Int. Cl.
*G06F 1/00* (2006.01)
(52) U.S. Cl. ........ 713/323; 713/300; 713/320; 713/322; 713/324
(58) Field of Classification Search .................. 713/300, 713/320, 322, 323, 324
See application file for complete search history.

(56) References Cited

U.S. PATENT DOCUMENTS

| | | | |
|---|---|---|---|
| 5,339,445 A * | 8/1994 | Gasztonyi ..................... | 713/324 |
| 6,859,882 B2 | 2/2005 | Fung | |
| 6,885,974 B2 | 4/2005 | Holle | |
| 6,957,353 B2 | 10/2005 | Bresniker et al. | |
| 7,032,119 B2 | 4/2006 | Fung | |
| 7,042,202 B2 | 5/2006 | Sutardja et al. | |
| 7,043,650 B2 | 5/2006 | Bresniker et al. | |
| 7,051,215 B2 | 5/2006 | Zimmer et al. | |
| 7,058,826 B2 | 6/2006 | Fung | |
| 7,082,373 B2 | 7/2006 | Holle | |
| 7,082,543 B2 | 7/2006 | Lin | |
| 7,146,511 B2 * | 12/2006 | Barr et al. ..................... | 713/300 |
| 7,210,048 B2 * | 4/2007 | Bodas ........................... | 713/320 |
| 7,222,245 B2 * | 5/2007 | Singh ............................ | 713/300 |
| 7,272,732 B2 * | 9/2007 | Farkas et al. ................. | 713/320 |
| 7,386,743 B2 * | 6/2008 | Bahali et al. ................. | 713/300 |
| 7,461,274 B2 * | 12/2008 | Merkin ......................... | 713/300 |
| 7,555,666 B2 * | 6/2009 | Brundridge et al. .......... | 713/340 |
| 7,598,702 B2 * | 10/2009 | Walrath ........................ | 320/107 |
| 2003/0056126 A1 * | 3/2003 | O'Connor et al. ............ | 713/300 |
| 2003/0158609 A1 * | 8/2003 | Chiu .............................. | 700/22 |
| 2003/0217297 A1 * | 11/2003 | Gschwind et al. ............ | 713/300 |
| 2004/0163001 A1 * | 8/2004 | Bodas ........................... | 713/300 |
| 2004/0268166 A1 * | 12/2004 | Farkas et al. ................. | 713/320 |
| 2005/0076251 A1 * | 4/2005 | Barr et al. ..................... | 713/300 |
| 2005/0120254 A1 * | 6/2005 | Suzuoki et al. ............... | 713/320 |
| 2005/0125703 A1 * | 6/2005 | Lefurgy et al. ............... | 713/320 |
| 2005/0138335 A1 | 6/2005 | Samra et al. | |
| 2005/0149697 A1 | 7/2005 | Enright et al. | |
| 2005/0258154 A1 | 11/2005 | Blankenship et al. | |
| 2005/0289362 A1 * | 12/2005 | Merkin et al. ................ | 713/300 |
| 2006/0123253 A1 | 6/2006 | Morgan et al. | |
| 2006/0123257 A1 | 6/2006 | Silvester | |
| 2006/0135094 A1 | 6/2006 | Dor et al. | |
| 2006/0190745 A1 | 8/2006 | Matsushima et al. | |
| 2006/0202714 A1 | 9/2006 | Hoang et al. | |
| 2006/0218423 A1 | 9/2006 | Diefenbaugh et al. | |
| 2006/0253715 A1 * | 11/2006 | Ghiasi et al. ................. | 713/300 |
| 2007/0050644 A1 * | 3/2007 | Merkin ......................... | 713/300 |
| 2007/0180280 A1 * | 8/2007 | Bolan et al. .................. | 713/300 |

(Continued)

*Primary Examiner* — Thomas Lee
*Assistant Examiner* — Jaweed A Abbaszadeh

(57) ABSTRACT

A server manages power and performance. The server comprises a plurality of processor and associated storage and input/output interface components, arranged into a plurality of independent compute cells. One or more performance metrics descriptive of performance of the independent compute cell plurality are selected and an optimization evaluation of the one or more performance metrics is performed. The independent compute cell plurality is tuned based on the optimization evaluation.

20 Claims, 8 Drawing Sheets

U.S. PATENT DOCUMENTS

| | | | |
|---|---|---|---|
| 2007/0192641 A1* | 8/2007 | Nagendra et al. | 713/320 |
| 2007/0271475 A1* | 11/2007 | Hatasaki et al. | 713/324 |
| 2008/0046766 A1* | 2/2008 | Chieu et al. | 713/300 |
| 2008/0082844 A1* | 4/2008 | Ghiasi et al. | 713/323 |

* cited by examiner

SERVER CONFIGURED FOR MANAGING POWER AND PERFORMANCE

BACKGROUND OF THE INVENTION

Servers traditionally have minimal capability for power management. In recent years, system compaction has resulted in dramatic increases in data center power densities and related cooling problems. Rising energy costs also raise the incentive for power management.

In recent years, server power consumption has become a major information technology (IT) concern in terms of both energy cost and data center capacity. Servers form factors have shrunk and critical system components such as processors have increased in power. As a result, IT suppliers can consolidate much more compute capability into rack cabinets with a resulting significant increase in power density.

SUMMARY

In accordance with an embodiment of a server that manages power and performance, the server comprises a plurality of processor and associated storage and input/output interface components, arranged into a plurality of independent compute cells. One or more performance metrics descriptive of performance of the independent compute cell plurality are selected and an optimization evaluation of the one or more performance metrics is performed. The independent compute cell plurality is tuned based on the optimization evaluation.

BRIEF DESCRIPTION OF THE DRAWINGS

Embodiments of the invention relating to both structure and method of operation may best be understood by referring to the following description and accompanying drawings.

DETAILED DESCRIPTION

Figure 1A:
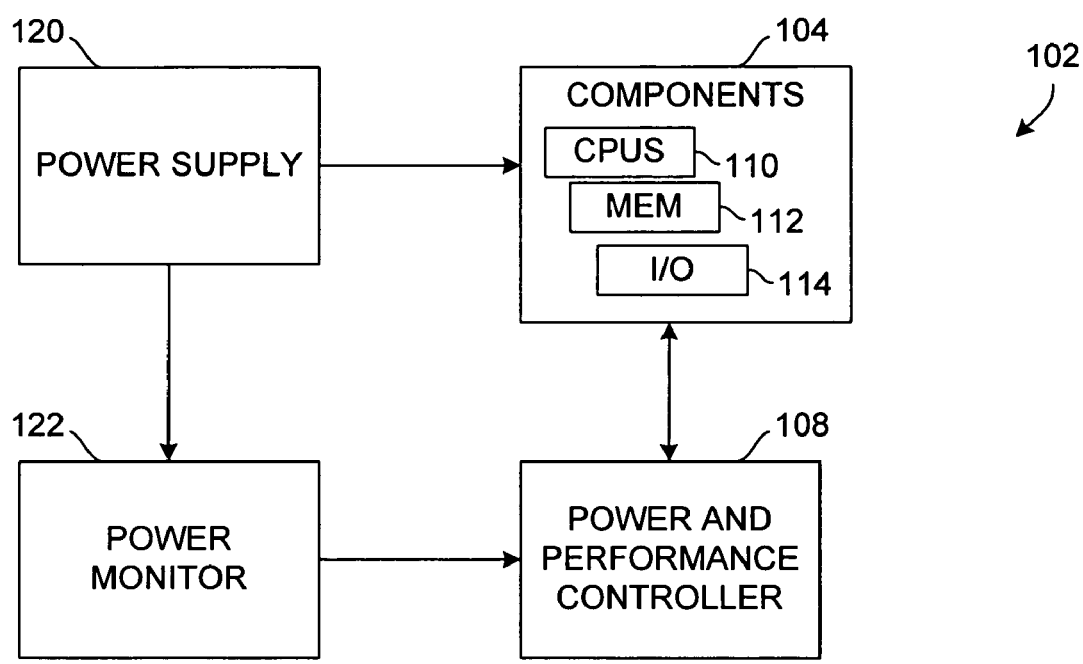
FIGS. 1A, 1B, and 1C are schematic block diagrams showing an embodiment of a server that is adapted to manage power and performance in a system.

Referring to FIGS. 1A, 1B, 1C, and 1D, schematic block diagrams and a pictorial view depict an embodiment of a server 100 that is adapted to manage power and performance in a system 102. The server 100 comprises a plurality of processor and associated storage and input/output interface components 104 arranged into a plurality of independent compute cells 106. A controller 108 coupled to the independent compute cells 106 is configured select one or more performance metrics descriptive of performance of the independent compute cells 106 and perform an optimization evaluation of the selected performance metrics. The controller 108 tunes the independent compute cells 106 based on results of the optimization evaluation.

In various arrangements, the components 104 can include various numbers of processors 110, storage devices 112, input/output interfaces 114, and any other components that may be selected for functionality.

Figure 2A:
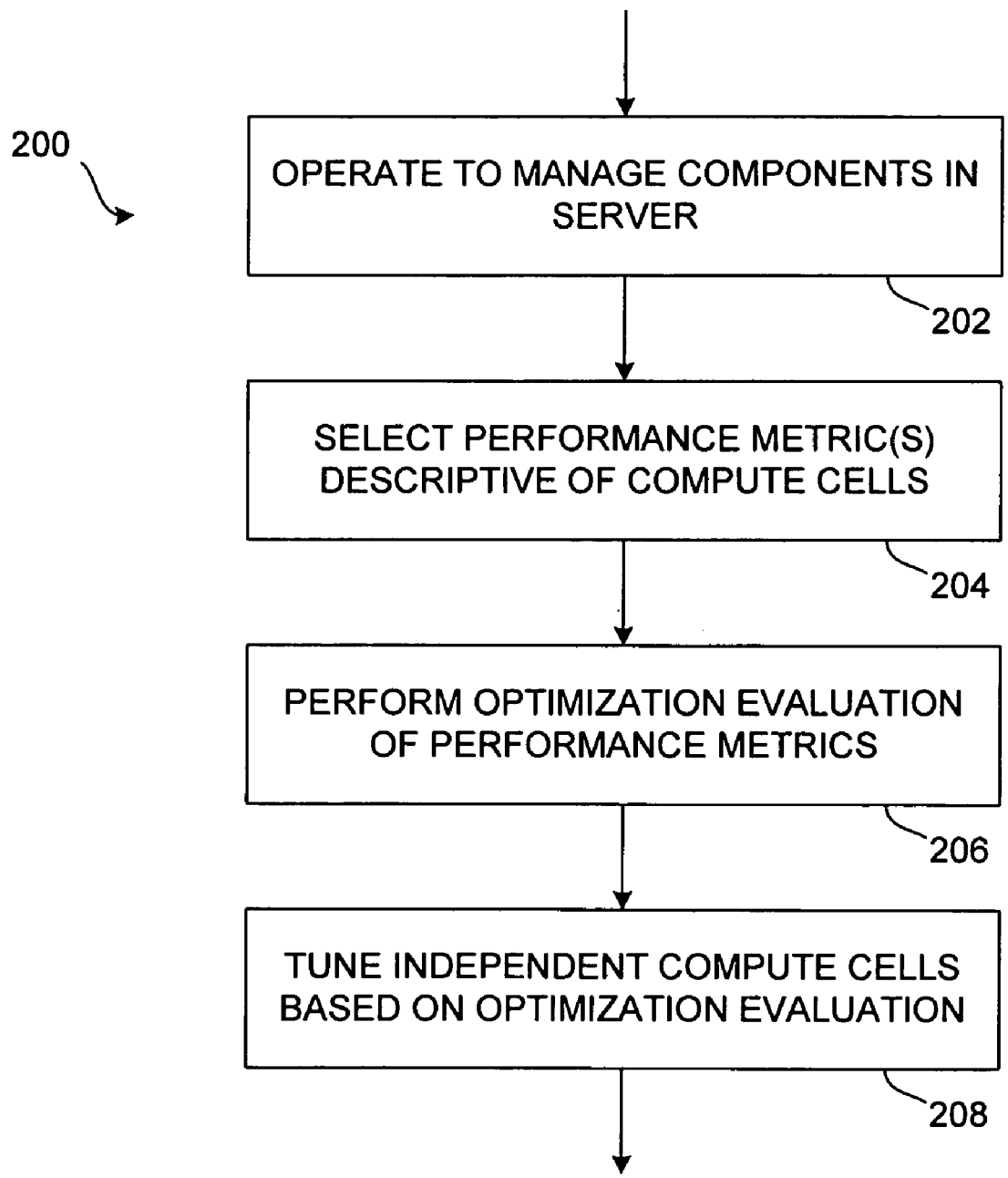
FIGS. 2A, 2B, 2C, and 2D are flow charts depicting embodiments of techniques for managing power and performance in the server.

The controller 108 can execute a management application for server power and performance optimization. Referring to FIG. 2A, a flow chart depicts an embodiment of a technique 200 that can be executed by the controller 108 for managing power and performance in the server 100. The controller 108 can operate 202 to manage components 104 in the server 100 including multiple processors 110 and associated storage 112 and input/output interface 114 components, which are arranged into multiple independent compute cells 106. The controller 108 selects 204 one or more performance metrics that are descriptive of performance of the independent compute cells 106 and performs 206 an optimization evaluation of the performance metrics. Based on the optimization evaluation 206, the controller 108 tunes 208 the independent compute cells 106 based on the optimization evaluation.

A server management application operating within a general purpose operating system utilizes an optimization algorithm to tune a server for a user-selected metric. Any suitable optimization algorithm can be implemented in various embodiments. Suitable algorithms can include Nelder-Mead simplex algorithm, simple interval halving method, Golden Section method, and decent method for a manageability interface which tunes for metrics determined by the user. Other models for optimization may include any suitable modeling technique including predictive modeling, probabilistic modeling, tabu search, Fletcher-Powell-Reeves method, memetic algorithms, local or global optimization, metaheuristics, and the like. In various embodiments, the performance metrics can be selected 204 from a suitable metrics such as performance/Watt, maximized system performance, server energy minimization, and others.

In the Nelder-Mead simplex technique, an initial simplex is specified and an optimal value found by iterative modifications through reflections, expansions, and contractions by feedback. In the Golden Section search technique, optimization is made using an analytical and variational scheme with one parameter varied independently of other parameters at a time in a search for optimal values. A parameter dimension with largest uncertainty can be selected with other parameters maintained invariant. In the selected dimension, a golden search is made wherein, starting with two points, a third point is selected that subdivides the interval in accordance with the golden section. The interval can be increased until the third point is selected that gives a best result. The large interval is iterative subdivided based on the golden section.

The independent compute cells 106 can be tuned 208 based on the type of applications currently executing on the cells 106.

One or more of several techniques can be implemented to tune 208 the independent compute cells 106. A control can be used that causes a processor 110 to halt execution whereby one or more processors 110 in the independent compute cell plurality enter a low power state when idle. In another example, clock throttling can be implemented for a processor clock in one or more processors 110 of the independent compute cells 106. Furthermore, the controller 108 can cause dynamic transitioning of on-demand processor performance state (P-state) in one or more selected processors 110. The controller 108 can also adjust a processor multiplier and/or requested voltage level in real-time.

Optimizations can operate for activation in real time in response to a detected measure of performance or a proxy for performance and power. System adjustments for tuning can be enabled through various techniques such as enabling use of a control that causes a processor to halt execution, for example activating PAL_HALT_LIGHT in an idle loop or dynamically controlling the processor P-state so that one or more processors in the independent compute cell plurality enter a low power state when idle. Optimization can be imposed or activated at the time of system or compute cell commissioning or during maintenance or repair by running a tuning application based on synthetic workloads that map a range of metrics. Optimization can be implemented for a general set of system capabilities. The tuning application can be adjusted to account for different types of applications, for example database, high-performance computing, and the like.

Figure 2B:
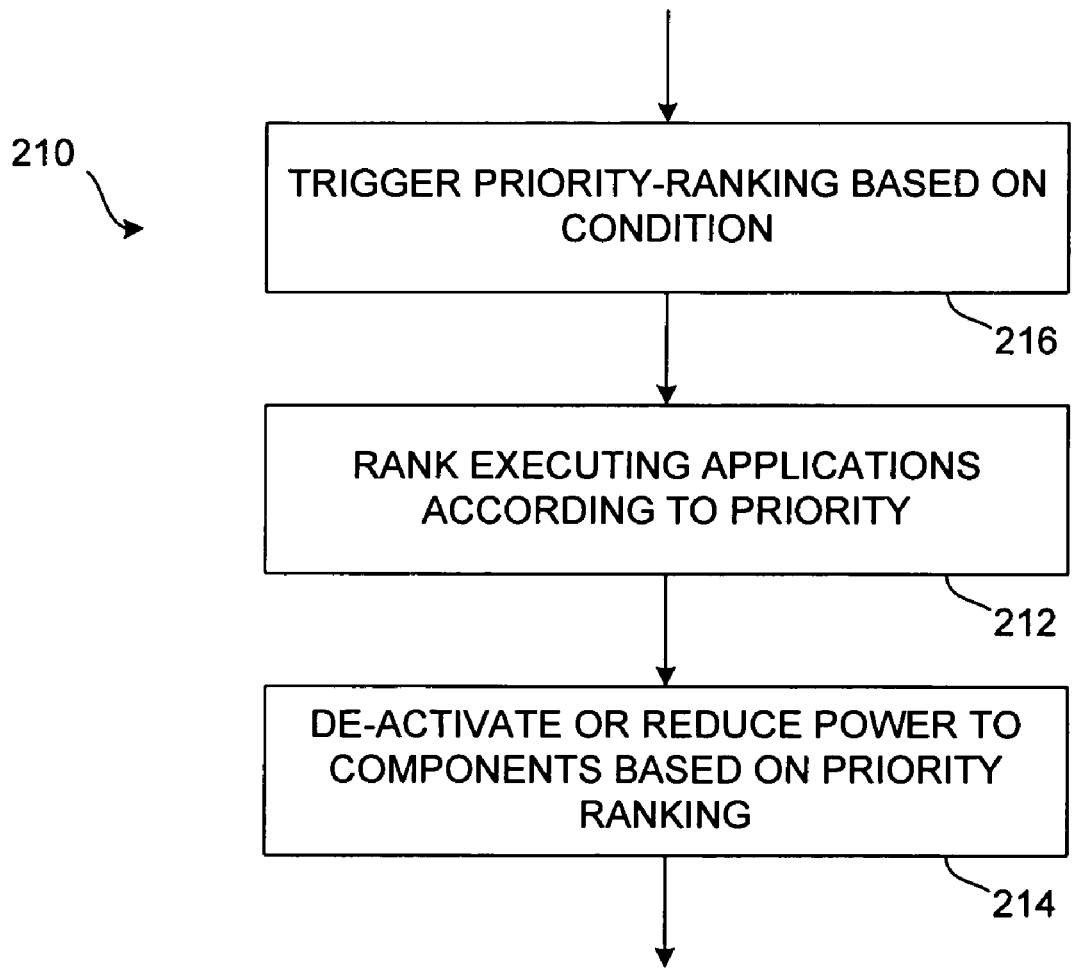

System power consumption may be reduced by selectively reducing performance or functionality to individual system components 104 using an application priority scheme determined by the user. Referring to FIG. 2B, a flow chart illustrates an embodiment of a method 210 for managing power in the server 100 by application prioritization. The method 210 comprises priority-ranking 212 applications executing on the independent compute cells 106 and stopping and/or reducing 214 performance of components 104 in the independent compute cells 106 that execute applications ranked with low priority.

The controller 108 can trigger 216 priority-ranking according to a selected condition, for example a predefined abnormal ambient temperature condition, a predefined data center abnormal power condition, a predefined result of an applied business rule that minimizes Information Technology (IT) cost, or others. Priority-ranking 212 of the applications and stopping and/or reducing performance of components 104 can be applied across multiple compute cells 106 and/or systems 102 in a data center.

Enterprise servers 100 typically contain several processors 110 and associated memory or storage 112, and input/output (I/O) interfaces 114. Many systems contain independent compute cells 106 which function as independent compute resources within a shared rack 116. Several applications often run simultaneously on the server 100.

The illustrative power management scheme 210 can manage system power consumption by applying a priority ranking of applications running on the server 100 and stopping or reducing the performance of low-priority items. The priority ranking can be explicitly assigned by the user via a management application or automatically assigned based on time-averaged processor usage. Application of priority ranking for power management may be triggered by an abnormal ambient temperature condition, data center power shortage, or by application of a business rule which seeks to minimize IT costs at the expense of application performance.

Application performance reduction, and hence power reduction, can be attained by forcing specific selected processors 110 and other system components 102 into a reduced performance mode via processor p-states, or an analogous method. The method may be applied to larger portions of the system 102. For example, if a low-priority application runs on a separate cell, the entire cell power consumption may be reduced or, in an extreme case, the cell power can be terminated completely.

The concept of power management based on application priority can be extended to multiple system, for example using a management application such as OpenView, a management package made available by Hewlett-Packard Company, can reduce or eliminate power to many different systems within an enterprise according to a priority ranking.

The illustrative power management technique improves over typical power management schemes for servers which have typically been limited to protecting chips from damage due to over-temperature conditions or fan failures. The concept of managing performance on some or all applications running on a server can be applied across multiple cells and/or systems in a data center and improves over demand-based switching applied to a single system image.

Power management and performance/Watt are improved by the illustrative technique which enables optimal usage of p-states and other performance/power-reducing techniques through a general purpose operating environment-based management utility for enterprise server power management.

Figure 2C:
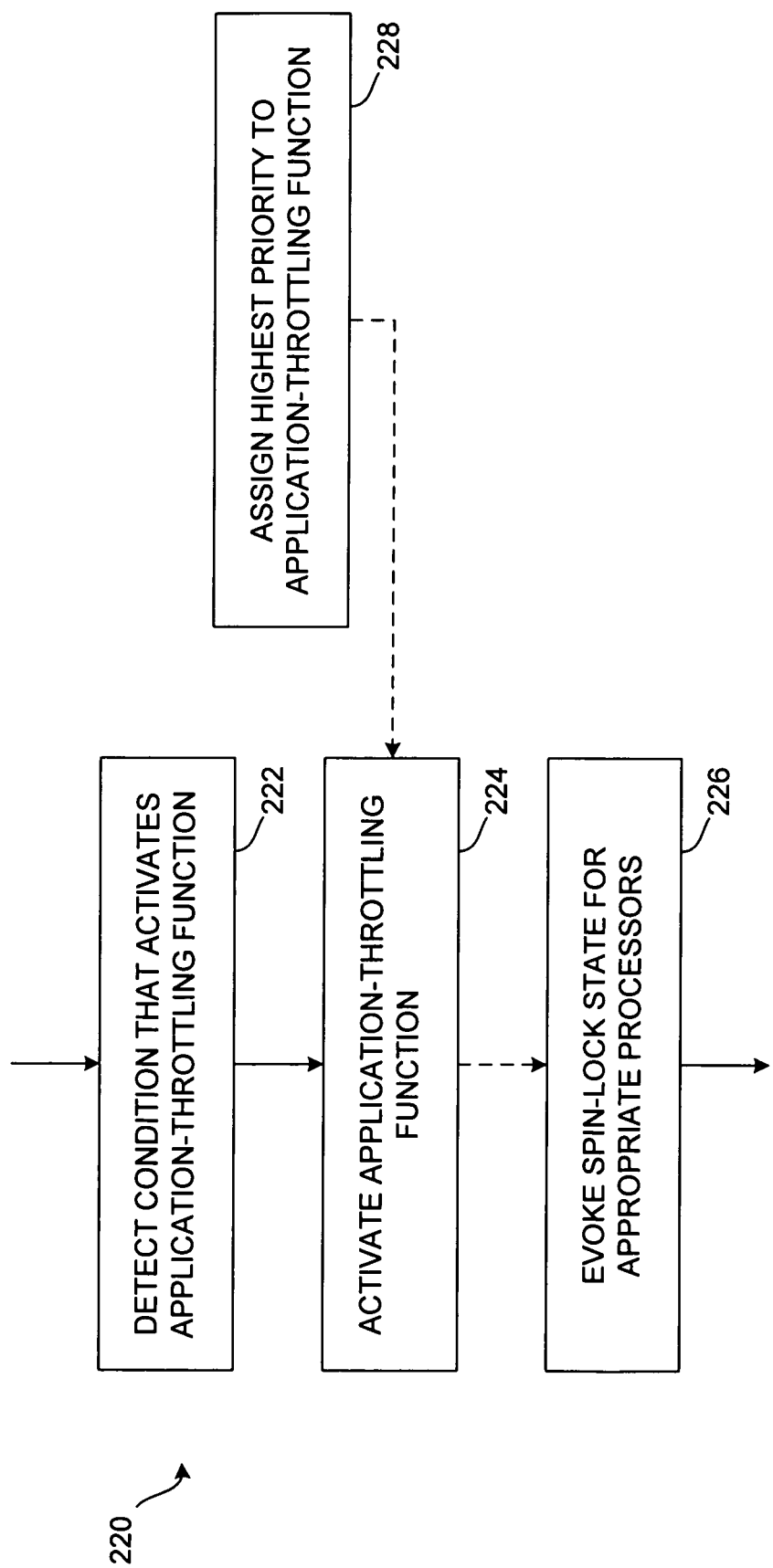

An application-throttling function can be implemented in an execution engine incorporated into an operating environment. When requested by external stimulus or direct customer intent, a system 102 can enter a low power/moderate response state in which the operating environment purposely enters a spin-lock state for a high percentage of CPU time, essentially starving application CPU utilization. As a result, system power can be reduced since memory requests are reduced and an application or applications can continue to progress and respond to external input signals or conditions. Referring to FIG. 2C, a flow chart shows an embodiment of a method 220 for power management by throttling of application processor bandwidth. The method 220 can be implemented by the controller 108 which detects 222 a condition that activates an application-throttling function and activates 224 the application-throttling function that operates in a low-power/moderate-response state. In an illustrative embodiment, the application-throttling function can operate by evoking 226 a spin-lock state for one or more selected processors 110 in the plurality of independent compute cells 106.

In the spin-lock state, an execution thread waits in a loop, or spins, while repeatedly checking until the lock becomes available. The thread remains active but does not perform a useful task so that the processor executing the thread waits while performing no operations that consume power.

The application-throttling function can be assigned 228 an execution priority that is higher than currently executing applications to impose throttling of Central Processing Unit (CPU) bandwidth. For example, a CPU can be executing an application at a relatively high priority and impose a high computational load. If a user, for example an IT administrator, may detect an undesired power condition arising from the high computational load and can quickly reduce the load by activating the application-throttling function at a priority higher than the application that creates the undesired power condition. In other circumstances or conditions, a management controller can detect the undesired power condition and automatically evoke the application-throttling function.

In various embodiments, the low-power/moderate-response state can be evoked in response to a selected condition, for example a direct user input signal, a detected power condition and/or a detected temperature condition, an external stimulus, or other conditions.

The controller 108 can manage or fine-tune the throttling function for example by selecting a percentage of processor time for which the one or more selected processors is to operate in the spin-lock state and operating the one or more selected processors in the spin-lock state for the selected percentage of processor time.

Power management is traditionally performed by managing hardware resources, for example by changing CPU power state and/or disabling system components such as disk, screen, processor, and communication ports. Traditional functionality is sub-optimal in various cases. In thermal error conditions, managing hardware resources may not sufficiently reduce power to maintain operational state. In customer driven low-power modes, managing hardware resources may not sufficiently reduce power to meet system power savings goals. In CPU shutdown and/or system shutdown conditions, system power levels may meet customer and/or thermal requirements but system applications may not meet application responsiveness and/or forward progress goals.

The illustrative power management technique using application throttling enables system level power reduction beyond what system hardware is can supply while improving application responsiveness over conventional low-power application modes that entail turning off CPU resources.

The controller 108 that implements power management by throttling of application CPU bandwidth can be implemented using two components—control component and execution component. A control component can implement a capability that determines whether the system 102 should enter a low-power/moderate-response state. The capability can be driven by direct customer input or an external stimulus, for example system fan failure. The capability can also cause the system to exit the low-power/moderate-response state, once again either by direct customer input or external stimulus, for example system fan replacement. In addition, the control component can indicate the percentage of CPU time the execution function remains in the spin-lock state. A higher spin-lock cycle enables more power savings, but less application forward progress.

The execution component can implement a functionality to enter a spin-lock state that essentially starves application CPU utilization and minimizes memory access, and thus memory power which is the incremental power savings enabled by the illustrative technique. The execution component can be incorporated into the operating environment or a high-priority application. The execution component can support multiple percentages of spin-lock functionality based on the control component input.

Power management by throttling of application CPU bandwidth enables system level power reduction beyond what modifying system hardware state alone is able to supply while improving application responsiveness over existing options that entail turning off CPU resources.

As computer system deployments become more condensed, issues of total power consumption and heat generation become concerns for IT suppliers that deploy the systems. Budgetary considerations call for an optimal use of electrical and thermal resources in such deployed systems. In situations where reliability is paramount but capacity is not uniformly utilized throughout the day, optimization becomes difficult. Various trade-offs can be considered. For example, a highly redundant system operating with maximal thermal and electrical loads typically draws more power and generates more heat during off-peak periods or periods where the redundancy is not used. A power and performance management technique can sacrifice redundancy in the off-peak conditions.

The system 102 can also be configured to perform a method for reducing the power consumption and temperature of a computer system by dynamically removing components 104. Components can typically include elements of an Input/Output (I/O) subsystem, a cooling subsystem, and manageability subsystem. In one embodiment, a target reduction in power consumption can be identified and redundant subsystems shut down to meet the target reduction. As operating circumstances vary, target power consumption varies and the subsystems that are shut down can vary. As demands for the system to increase redundancy vary, subsystems can selectively be re-activated. In the system with varied redundancy, other subsystems may be targeted for shutdown to meet the target power reduction. In another embodiment, compliance with pre-determined thermal envelope criteria can be attained by selectively shutting down subsystems.

Figure 2D:
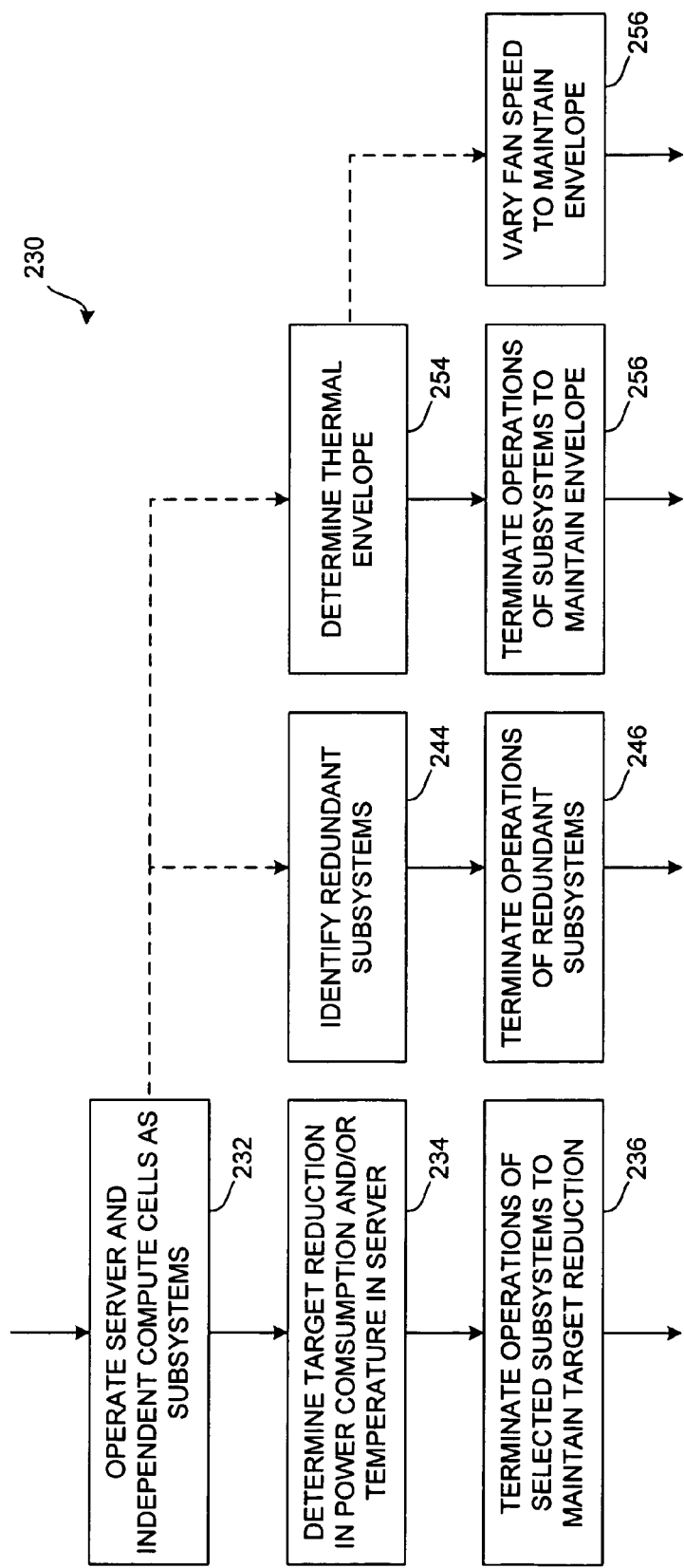

Referring to FIG. 2D, a flow chart depicts an embodiment of a method 230 for dynamic resource control. A controller 108 can operate 232 the server 100 and associated independent compute cells 106 as multiple subsystems. A target reduction in power consumption and/or temperature in the server 100 are determined 234. The controller 108 terminates 236 operations of selected subsystems in the independent compute cell plurality 106 to maintain the target reduction.

For example, the server 100 and the independent compute cells 106 can be operated 232 as a plurality of subsystems such as interface subsystems, input/output subsystems, cooling subsystems, control subsystems, manageability subsystems, and/or the like.

In particular configurations or conditions, the controller 108 can identify 244 redundant subsystems of the independent compute cells 106 and terminate 246 operations of the redundant subsystems in the independent compute cells 106 to maintain the target reduction.

Also in some conditions, the controller 108 can determine 254 a thermal envelope in the server 100 and terminate 256 operations of selected subsystems in the independent compute cells 106 to maintain the thermal envelope. Similarly, the controller 108 can determine 254 a thermal envelope in the server 100 and vary 266 fan speeds to maintain the thermal envelope.

Typically, data center operators can attempt to manage power in a system with a high-redundancy configuration by switching off entire systems during off-peak periods. For example, selected racks can be activated during the day but de-activated during the night, enabling redundancy when the periods of peak use and most risk from a lack of redundancy are known. However, such operation inefficiently uses resources and does not address the problem of reducing power consumption during a near-peak period when the system is in heavy use.

The illustrative technique for dynamically controlling resources can be implemented in several configurations. In a first embodiment, a computer system supplies notification to a general purpose operating system of a desired consumption level. The consumption may relate to power or thermal load, for example. The operating system identifies the target level and redundant subsystems can be controlled to reduce consumption. Redundant subsystems can include Peripheral Component Interconnect (PCI) slots, entire I/O subsystems, redundant control systems, or other systems. The operating system de-activates redundant systems to attain the desired consumption level. If conditions call for restoring redundant operation in the system, the operating system re-activates the redundant subsystem.

In another embodiment, the operating system can de-activate subsystems and can also vary fan speed to maintain a selected thermal envelope within the overall computer system.

In a further embodiment, the operating system proactively de-activates resources that are not redundant but are determined to be unused or underused, for example by monitoring through-put, thermal conditions, power usage in associated sub-systems, time-of-day, or the like.

In yet another embodiment, the operating system proactively de-activates redundant resources that perform mission critical availability when the system is not executing mission critical functionality, for example during off-hours.

In a further embodiment, the operating system reactively shuts down redundant resources in response to failure conditions, for example thermal conditions or otherwise, to maintain overall system uptime. Accordingly, the operating system enables system uptime in designated failure modes.

FIG. 1A illustrates an embodiment of the system 102 and includes components 104 powered by a power supply 120. The components 104 can include conventional components of a computer system, such as one or more processors 110, memory such as RAM, ROM, and the like, and storage devices 112, video cards, user input devices, and the like. The components 104 typically are selected based on the type of system 102. For example, the system 102 may include a server, a blade server in a rack system, a desktop computer, a laptop computer, a portable computing device such as personal digital assistant or mobile phone, and the like. Some components may be used only for specific types of computer systems. For example, a server may include multiple central processing units (CPUs), and a personal computer may include one CPU.

Power supply 120 can be integral to system 102 or an external or separate power system, such as in a rack system, connected to the system 102. The power supply 120 may vary depending on the type of the system 102. For example, the power supply 120 can include one or more conventional power supplies such as fuel cells, power supplies connected to an outside source, such as a power utility, and converting the power for use by computer systems, and the like.

A power monitor 122 connected to the power supply 120 can measure power generated by the power supply 120. A power and performance management controller 108 is connected to the power monitor 122 and the components 104 and can modify functionality of one or more of the components 104 to a lower-power state to reduce power consumption when appropriate. Components 104 in a lower-power state can also be elevated to a higher-power state by the management controller 108 if sufficient power is available.

Power monitor 122 can include a conventional power measuring circuit for measuring the power output from the power supply 120. Power supply 120 can supply power based on the demand of the components 104. Thus, as the components 104 use more power, the power generated by the power supply 120 increases. The power monitor 122 detects the power sourced by the power supply 120 which may dynamically increase and/or decrease. Power monitor 122 can measure sourced power of the power supply 120 continuously or periodically. The power monitor 122 measures power consumption of the components 104. The power monitor 122 can be a power measuring circuit connected to an output of a power supply or can be implemented for determining power consumption of the components 104, such as connecting one or more power measuring circuits to the components 104 to measure power consumption of the system 102.

Figure 1B:
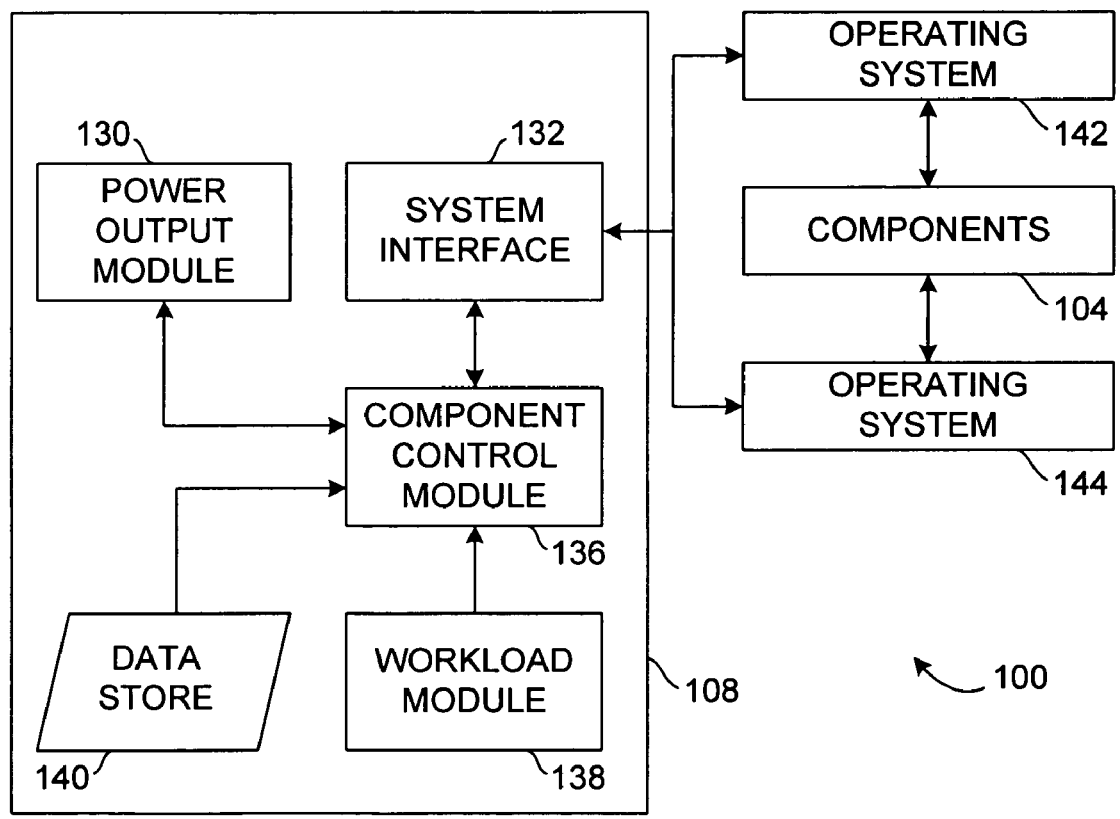

Management controller 108 can receive power output measurements from the power monitor 122. Otherwise, the power monitor 122 can send measurements to memory and/or a storage device for retrieval by the management controller 108. The management controller 108 can include a software-based, expert system. FIG. 1B illustrates a server 100 that can include the management controller 108. The management controller 108 can include a power output module 130, a component control module 136, a workload module 138, a data store 140, and a system interface 132. The power output module 130 determines power consumption of the components 104, for example by receiving power measurements from the power monitor 122. The power monitor 122 can measure the power generated by the power supply 120 either continuously or periodically. The measurements can be transmitted directly to the management controller 108 stored in memory/storage device for retrieval by the power output module 130, or both.

The data store 140 stores power-state information for the components 104 which can be used by the component control module 136 for selecting components to be placed in a lower-power or higher-power state. The component control module 136 stores the power state of the components 104 in the data store 140. The data store 140 can store a list of components 104, the power state of individual components 104, and optionally the power consumption of each of the components 104 in their current power state. For the components 104 that may be placed in multiple lower-power states, the data store 140 can identify the current power state the components 104 and the number of lower-power states, the power consumption range of the components 104, or the overall power consumption of the system 102 for each of the system states represented by placing the components 104 in any of their power states. For a processor in a lower-power state, for example, the data store 140 may identify the reduced clock speed and further identify the speeds to which the clock can be further reduced or increased and possibly the corresponding power consumption. The data store 140 can identify the current power consumption of the processor. The data store 140 can include data on the components 104 in a lower-power state or data on substantially all the components 104. Also, the data store 140 can store application priority information to identify which components 104 are associated with high-priority applications. The components 104 associated with high-priority applications can be placed in a lower-power state by the component control module 136.

The workload module 138 can also be connected to the component control module 136 and can transmit information to the component control module 136 for prioritizing components to be placed in a lower-power or higher-power state. For example, the components 104 may include multiple processors executing multiple applications of varying importance, such as may be identified by a system administrator and the like. The workload module 138 transmits information to the component control module 136 related to the importance of each application, and the component control module 136 may lastly place processors executing applications of higher importance in a lower-power state.

The component control module 136 can communicate with an operating system 142 or a system BIOS 144 to control the components 104 for example to place one or more of the components 104 in a lower-power state or to return one or more of the components 104 to a higher-power state. The component control module 136 can communicate with the operating system 142 through the system interface 132 which can be implemented as an application program interface, a function call or other similar interfacing technique.

Figure 1C:
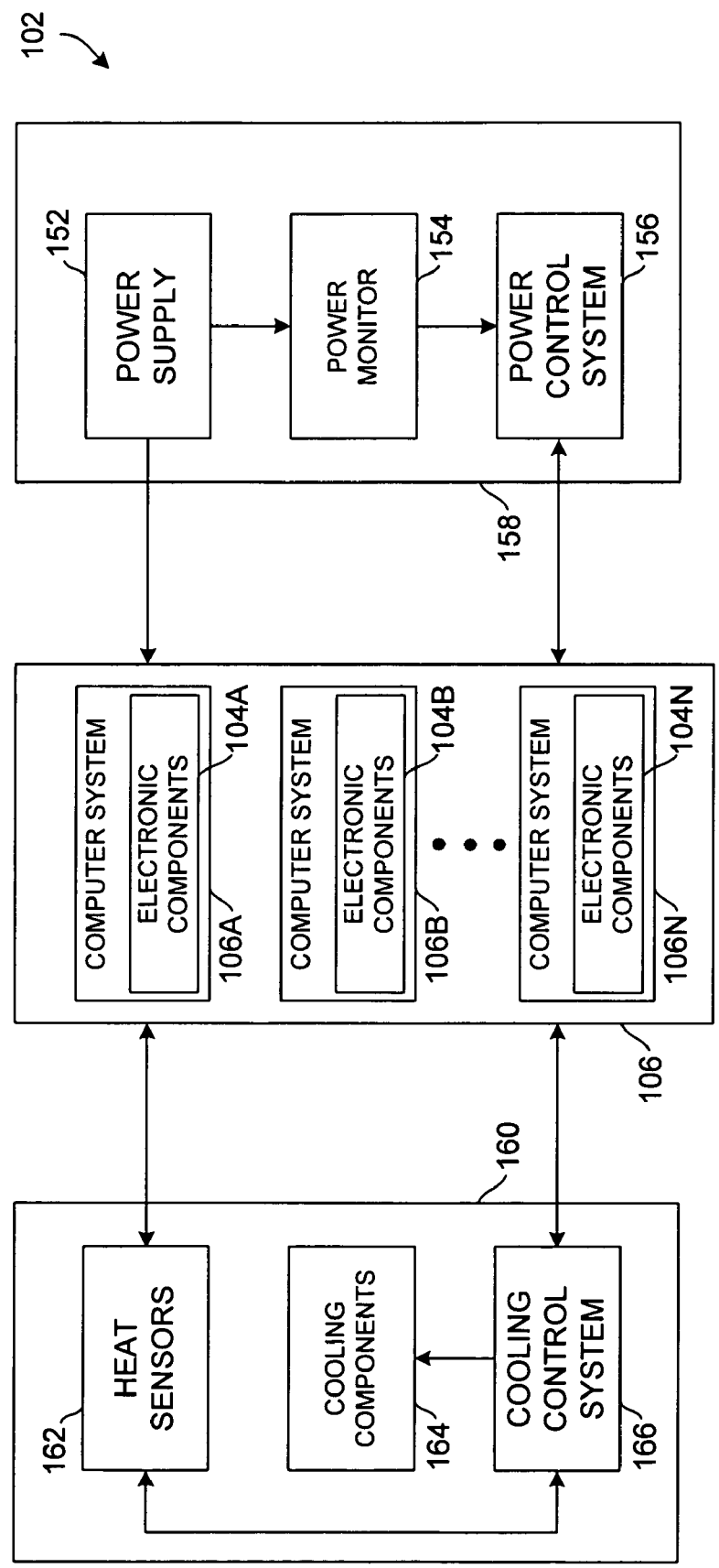

FIG. 1C illustrates a block diagram of a multi-computer system 102 employing a power system 150 and a cooling system 160, according to an embodiment of the invention. The multi-computer system 102 may be housed in a rack shown in the pictorial diagram of FIG. 1D or other enclosure such as cabinet, data center, and the like to facilitate cooling and power management.

The system 102 includes compute cells 106 (for example, compute cells 106A . . . N having electronic components 104A . . . N), a power system 150 that generates power for the compute cells 106, and a cooling system 160 for removing heat dissipated by the electronic components 104A . . . N for the compute cells 106. The components 104A . . . N can include conventional components of a computer system, such as one or more processors, memory (RAM, ROM, or the like), storage devices (hard drives, and others), video cards, user input devices, and the like. The components 104A . . . N can vary in properties and type depending on the type of computer system implemented. For example, the compute cells 106 may include a standalone server, a server in a rack system, one or more server blades housed in an enclosure and mounted in a rack, system boards, and the like.

The power system 150 includes one or more power supplies 152, a power monitor 154, and a power control system 156. The power supply 152 generates power for the compute cells 106, the cooling system 160, and the power system 150. The power monitor 154 is connected to the power supply 152 for monitoring the power generated by the power supply 152. The power monitor 154 can include a conventional power measuring circuit for measuring the power output of the power supply 152. Otherwise, the power monitor 154 can include one or more power measuring circuits connected to sections of a power bus, such as the power bus 170 shown in FIG. 1D, which supplies power to the compute cells 106. The power monitor 154 measures the power consumption of the compute cells 106 using the one or more power measuring circuits connected to the power bus.

The power control system 156 is connected to the power monitor 154, the compute cells 106, and a cooling control system 166. The power control system 156 may place one or more of the components 104A . . . N in a lower-power state in response to the power supply 152 and/or the cooling system 160 nearing full capacity. The power control system 156 is also connected to the cooling system 160, and more specifically to a cooling control system 166. The power control system 156 may place one or more components 104A . . . N in a lower-power state to reduce heat dissipation if insufficient cooling resources are available to sufficiently remove heat being dissipated by the compute cells 106. The power control system 156 can receive a message from the cooling control system 166 reporting that sufficient cooling resources are not available. Then, the power control system 156 can place one or more components 104A . . . N in a lower-power state to reduce heat dissipation of the compute cells 106.

Figure 1D:
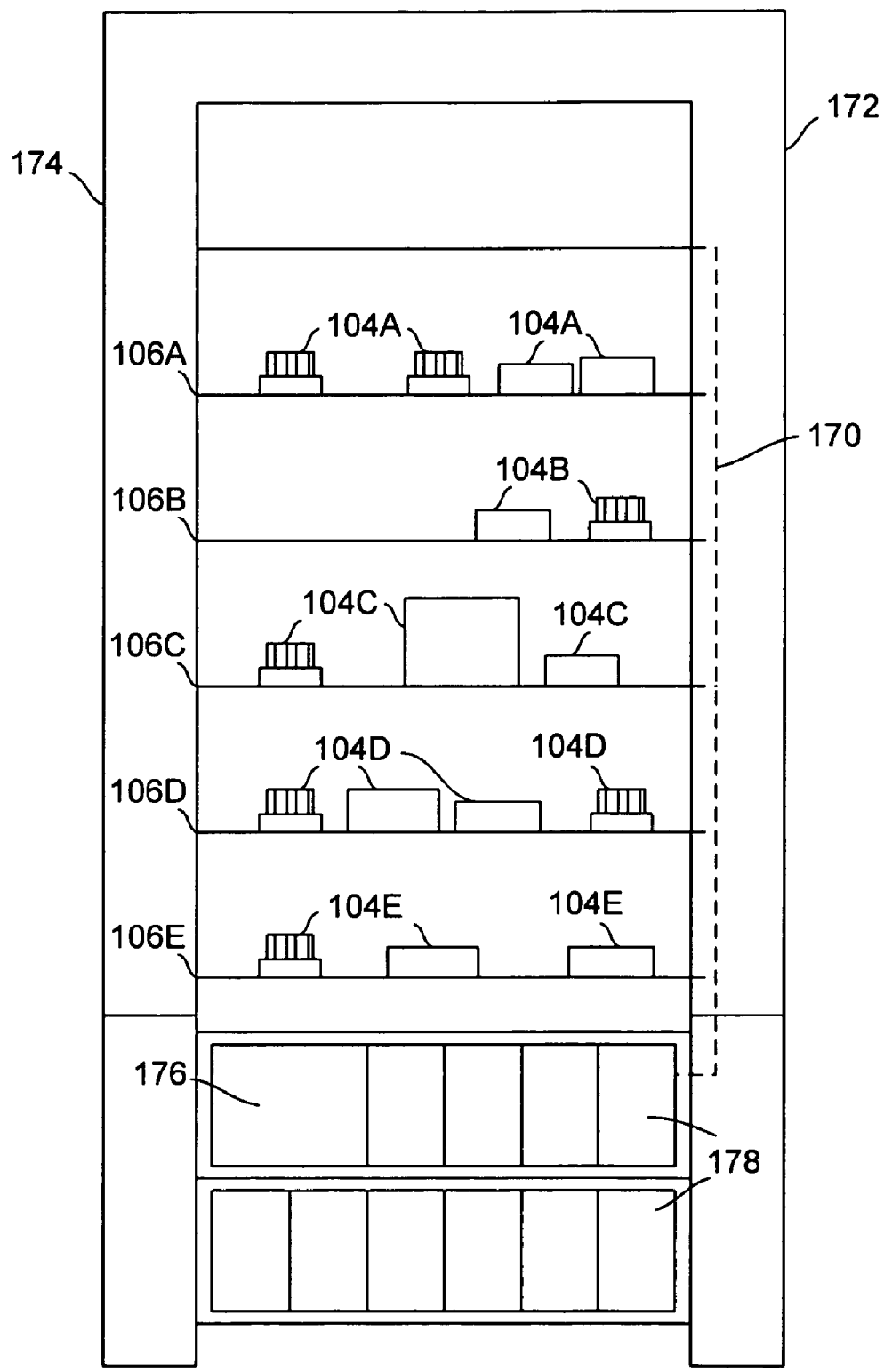
FIG. 1D is a schematic pictorial view illustrating an embodiment of the server.

FIG. 1D is a cross-sectional pictorial view illustrating a rack 116 that houses computer systems arranged into compute cells 106A-E. The rack 116 has a front 174 and a back 172. A power control system 176 controls power consumption of the compute cells 106A-E. The compute cells 106A-E can include components 104A-E. The compute cells 106A-E can include servers, storage devices, with the types of components 104A-E determined at least in part by the type of computer system. The rack 116 can house one or more power supplies 178 for generating power for the compute cells 106A-E and can also include a cooling system.

The compute cells 106A-E can be connected to a power bus 170, which distributes power generated from the power supply or supplies 178. The power control system 176 can remove power from one of the compute cells 106A-E by disabling a section of the power bus 170. Power may be removed from a portion of the power bus, using a switch controlled by the power control system 176. The power control system 176 can direct one of the compute cells 106A-E to de-activate instead of disconnecting a section of the power bus 170.

While the present disclosure describes various embodiments, these embodiments are to be understood as illustrative and do not limit the claim scope. Many variations, modifications, additions and improvements of the described embodiments are possible. For example, those having ordinary skill in the art will readily implement the steps necessary to provide the structures and methods disclosed herein, and will understand that the process parameters, materials, and dimensions are given by way of example only. The parameters, materials, and dimensions can be varied to achieve the desired structure as well as modifications, which are within the scope of the claims. Variations and modifications of the embodiments disclosed herein may also be made while remaining within the scope of the following claims. For example, a few specific examples of devices and techniques for managing power are described. The illustrative power management techniques can be used with any suitable types of sensors and sensed parameters. The illustrative techniques may be used with any suitable data center configuration and with any suitable servers, computers, and devices.

What is claimed is:

1. A method of managing power and performance in a server comprising:
    operating a server comprising a plurality of processor and associated storage and input/output interface components, arranged into a plurality of independent compute cells;
    selecting one or more performance metrics descriptive of performance of the plurality of independent compute cells;
    performing an optimization evaluation of the one or more performance metrics to determine optimal values;
    ranking applications executing on the plurality of independent compute cells in a selected order of priority; and
    tuning the plurality of independent compute cells based on the optimal values associated with the optimization evaluation, wherein said tuning comprises:
        based on one or more of the optimal values, stopping and/or reducing performance of components in the plurality of independent compute cells that execute applications ranked with low priority.

2. The method according to claim 1 further comprising:
    selecting one or more performance metrics from a group consisting of performance/Watt, maximized system performance, server energy minimization; and
    executing an optimization algorithm that optimizes the one or more performance metrics.

3. The method according to claim 1 further comprising:
    tuning the plurality of independent compute cells for an application according to application type executing on the plurality of independent compute cell cells.

4. The method according to claim 1 further comprising:
    tuning the plurality of independent compute cells for an application according to application type selected from a group consisting of:
        enabling use of a control that causes a processor to halt execution whereby one or more processors in the plurality of independent compute cells enter a low power state when idle;
        clock throttling for a processor clock in one or more processors in the plurality of independent compute cells;
        dynamically transitioning on-demand processor performance state (P-state); and
        adjusting processor multiplier and/or requested voltage level in real-time.

5. The method according to claim 1 further comprising:
    triggering the ranking of the applications according to a condition selected from a group of conditions consisting of:
        a predefined abnormal ambient temperature condition;
        a predefined data center abnormal power condition; and
        a predefined result of an applied business rule that minimizes Information Technology (IT) cost.

6. The method according to claim 1 further comprising:
applying the ranking of applications and stopping and/or reducing performance of components across multiple compute cells and/or systems in a data center.

7. The method according to claim 1 further comprising:
detecting a condition that activates an application-throttling function; and
activating the application-throttling function that operates in a low-power/moderate-response state comprising:
evoking a spin-lock state for one or more selected processors in the plurality of independent compute cells.

8. The method according to claim 7 further comprising:
assigning the application-throttling function an execution priority that is higher than currently executing applications.

9. The method according to claim 7 further comprising:
evoking the low-power/moderate-response state in response to a condition selected from a group consisting of:
a direct user input signal;
a detected power condition and/or a detected temperature condition; and
an external stimulus.

10. The method according to claim 7 further comprising:
selecting a percentage of processor time for which the one or more selected processors is to operate in the spin-lock state; and
operating the one or more selected processors in the spin-lock state for the selected percentage of processor time.

11. The method according to claim 1 further comprising:
operating the server and associated plurality of independent compute cells as a plurality of subsystems;
determining a target reduction in power consumption and/or temperature in the server; and
terminating operations of selected subsystems in the plurality of independent compute cells to maintain the target reduction.

12. The method according to claim 11 further comprising:
identifying redundant subsystems of the plurality of independent compute cells; and
terminating operations of the redundant subsystems in the plurality of independent compute cells to maintain the target reduction.

13. The method according to claim 11 further comprising:
operating the server and the plurality of independent compute cells as a plurality of subsystems selected from a group consisting of interface subsystems, input/output subsystems, cooling subsystems, control subsystems, and manageability subsystems.

14. The method according to claim 11 further comprising:
determining a thermal envelope in the server; and
terminating operations of selected subsystems in the plurality of independent compute cells to maintain the thermal envelope.

15. The method according to claim 11 further comprising:
determining a thermal envelope in the server; and
varying fan speeds to maintain the thermal envelope.

16. A server comprising:
a plurality of processor and associated storage and input/output interface components arranged into a plurality of independent compute cells;
a controller coupled to the plurality of independent compute cells configured select one or more performance metrics descriptive of performance of the plurality of independent compute cells, rank applications executing on the plurality of independent compute cells in a selected order of priority, perform an optimization evaluation of the one or more performance metrics to determine optimal values, tune the plurality of independent compute cells based on the optimal values associated with the optimization evaluation, and based on one or more of the optimal values, stop and/or reduce performance of components in the plurality of independent compute cells that execute applications ranked with low priority.

17. The server according to claim 16 further comprising:
the controller configured for:
selecting one or more performance metrics from a group consisting of: performance/Watt, maximized system performance, server energy minimization;
executing an optimization algorithm that optimizes the one or more performance metrics;
tuning the plurality of independent compute cells selected from a group consisting of:
enabling use of a control that causes a processor to halt execution whereby one or more processors in the plurality of independent compute cells enter a low power state when idle;
clock throttling for a processor clock in one or more processors in the plurality of independent compute cells;
dynamically transitioning on-demand processor performance state (P-state); and
adjusting processor multiplier and/or requested voltage level in real-time.

18. The server according to claim 16 further comprising:
the controller configured for:
triggering the ranking of the applications in response to detection of a condition selected from a group of conditions consisting of:
a predefined abnormal ambient temperature condition;
a predefined data center abnormal power condition; and
a predefined result of an applied business rule that minimizes Information Technology (IT) cost.

19. The server according to claim 16 further comprising:
the controller configured for:
detecting a condition that activates an application-throttling function;
assigning the application-throttling function an execution priority that is higher than currently executing applications; and
activating the application-throttling function that operates in a low-power/moderate-response state comprising:
evoking a spin-lock state for one or more selected processors in the plurality of independent compute cells;
evoking the low-power/moderate-response state in response to a condition selected from a group consisting of:
a direct user input signal; and
an external stimulus;
selecting a percentage of processor time for which the one or more selected processors is to operate in the spin-lock state; and
operating the one or more selected processors in the spin-lock state for the selected percentage of processor time.

20. The server according to claim 16 further comprising:
the controller configured for:
operating the server and the plurality of independent compute cells as a plurality of subsystems selected from a group consisting of interface subsystems, input/output subsystems, cooling subsystems, control subsystems, and manageability subsystems;
determining a target reduction in power consumption and/or temperature in the server; and
terminating operations of selected subsystems in the plurality of independent compute cells to maintain the target reduction.

* * * * *

UNITED STATES PATENT AND TRADEMARK OFFICE
CERTIFICATE OF CORRECTION

| | | |
|---|---|---|
| PATENT NO. | : 8,001,407 B2 | Page 1 of 1 |
| APPLICATION NO. | : 11/590320 | |
| DATED | : August 16, 2011 | |
| INVENTOR(S) | : Christopher G. Malone et al. | |

It is certified that error appears in the above-identified patent and that said Letters Patent is hereby corrected as shown below:

In column 10, line 44, in Claim 3, delete "cell cells." and insert -- cells. --, therefor.

Signed and Sealed this
Fifteenth Day of January, 2013

David J. Kappos
*Director of the United States Patent and Trademark Office*